1,760,282

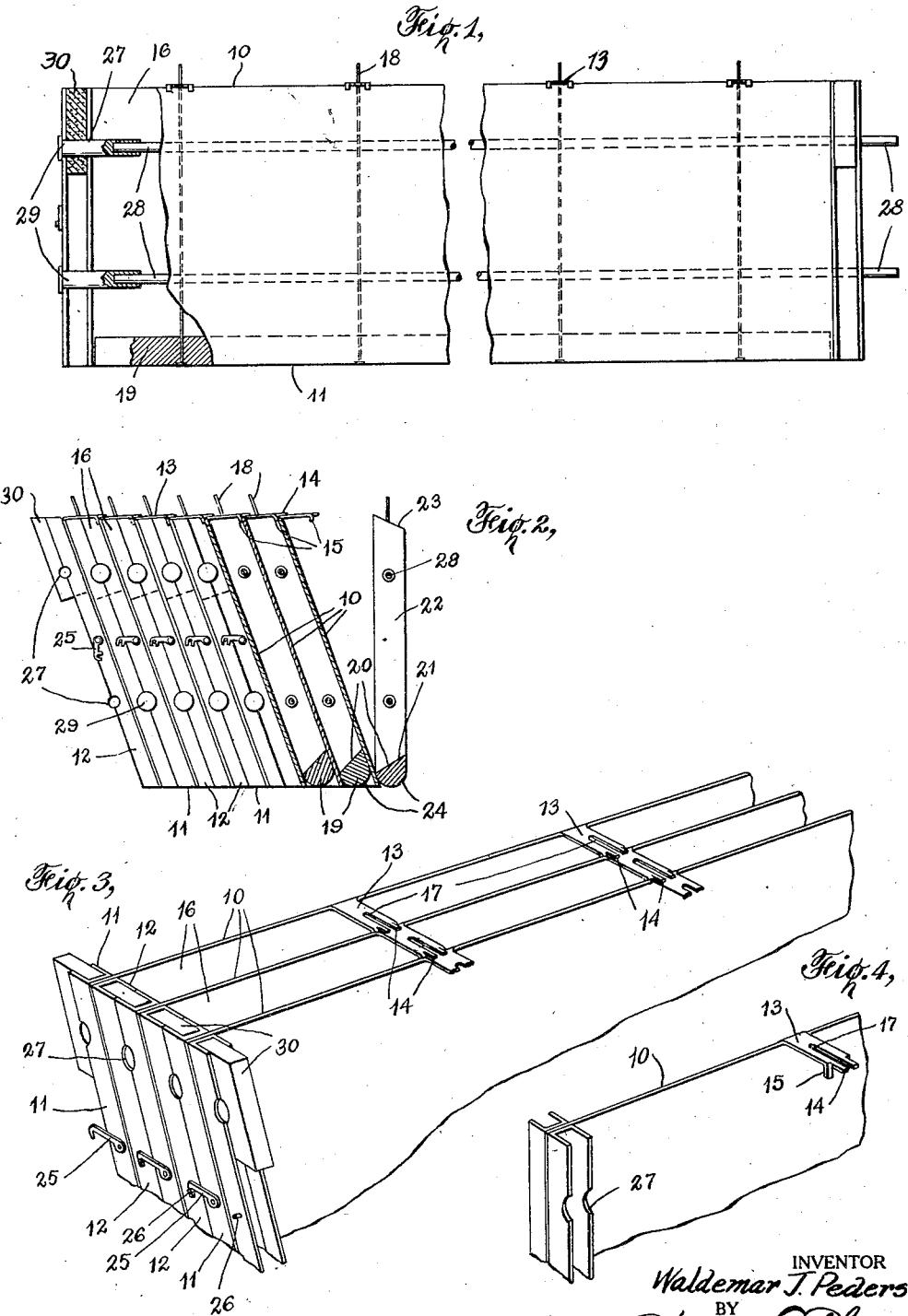
May 27, 1930.　　W. J. PEDERSEN　　1,760,282
CONCRETE MOLD
Filed Jan. 21, 1928
INVENTOR
Waldemar J. Pedersen
BY
Howard C. Thompson
ATTORNEY Patented May 27, 1930

UNITED STATES PATENT OFFICE

WALDEMAR J. PEDERSEN, OF FLORAL PARK, LONG ISLAND, NEW YORK

CONCRETE MOLD

Application filed January 21, 1928. Serial No. 248,541.

This invention relates to molds and particularly to devices of this class for molding concrete bodies or slabs and more particularly, reinforced bodies of this type adapted primarily for use in the construction of the walls or buildings; and the object of the invention is to provide a mold constructed from a multiplicity of substantially similar mold sections arranged side by side with means for coupling said sections together whereby a multiplicity of reinforced concrete bodies may be formed in a single pouring operation; a further object being to provide mold sections of the class specified which are mounted in an inclined position so as to form an angular or beveled face on the upper end of the molded bodies; a further object being to provide each of the mold sections or the mold chamber formed therebetween with a removable bottom member or pallet having an inclined surface forming a corresponding bevel at the opposite side edge of the molded body, and said bottom members or pallets having cam-shaped or arc-shaped outer surfaces facilitating the stacking of the molded bodies when set or partially set; a further object being to provide coupling and spacing members on the mold sections spaced longitudinally thereof and intermediate the end walls of said sections, said coupling and spacing members serving also to support reinforcing strands or rods centrally of the concrete bodies to be formed, and the end walls of said mold sections having apertures to receive longitudinal reinforcing strands or rods; and with these and other objects in view, the invention consists in a mold of the class and for the purposes specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a side and sectional view of a mold made according to my invention with part of the construction broken away.

Fig. 2 is a transverse section through a number of mold sections coupled together and illustrating the method of removing and stacking the molded bodies.

Fig. 3 is a perspective view of one corner portion of a number of mold sections; and, Fig. 4 is a perspective view of a part of one of a number of mold sections which I employ.

In carrying my invention into effect, I provide a plurality of similar or substantially similar mold sections, each section consisting of a longitudinal wall member 10, to the opposite side faces of which and at each end of said wall member are secured U-shaped end wall members 11 and 12. For purposes of description, the wall members 11 will be regarded as the back wall members and the wall members 12, the front wall members. The arrangement of the wall 10 with reference to the end walls 11 and 12, is angular, the angle being substantially twenty-two and a half degrees in the construction shown, but any desired angle may be provided. The upper and lower surfaces of the end wall members 11 and 12 are horizontal so that in mounting the mold sections upon a flat surface, the top of the mold will be parallel to such surface as clearly seen in Fig. 2 of the drawing. The walls 10, 11 and 12 in the construction shown are formed from sheet metal but these walls may be constructed of any desired material as will be apparent.

In the construction shown, the upper edge of the walls 10 are provided with longitudinally spaced reinforcing and spacing members 13 which extend forwardly from the wall 10 and are arranged horizontally and parallel with reference to the upper faces of the end walls 11 and 12. The forward ends of said members 13 are adapted to overlie the wall 10 of an adjacent mold section as seen at 14, Figs. 2 and 3, and are provided with downwardly extending tongues 15 which extend onto the back face of the adjacent wall 10 as clearly seen in Fig. 2. With this construction, the upper ends of the walls 10 of the separate sections are equally spaced apart to maintain the proper spacing of the walls 10 to form accurate mold chambers 16 within and between the walls 10 of the separate sections. The members 13 are also provided with apertures 17 extending to the center thereof in which the upper ends of reinforcing rods 18 are supported, the lower ends of said rods seating in apertures formed in bottom mold members or pallets 19 which are arranged between and serve to space the lower ends of the walls 10 of the mold sections.

The palllets 19 are provided with angular upper faces 20 when mounted in the chamber 16 to provide an angle or beveled edge 21 to the molded bodies 22 at the lower end thereof, as molded, which corresponds to the angular or beveled upper edge 23. The lower surface of the pallets 19 is rounded or cam-shaped in form as seen at 24, the curvature being such as to permit of the free rocking of said pallets with the molded bodies 22 thereon into the position shown at 20, Fig. 2 after the molded bodies have partially set, in order to support said bodies in stacked relation until the concrete of said bodies has been fully set. These pallets avoid the necessity of handling the molded bodies until they are in condition to withstand the stresses or strains of handling.

At this time, it may well be stated that my improved mold is designed to mold comparatively large building wall sections or slabs, such for example, as the building sections forming the subject matter of a companion application filed of equal date herewith, wherein the length of the molded bodies 22 may be anywhere from seven to twelve feet in length, and of a width, which is represented in the accompanying drawing by the height of the molds, of eighteen inches to three or four feet. Thus, it will be apparent that blocks of this size cannot be conveniently handled until the concrete thereof has been fully and thoroughly set.

The outer faces of the end walls of the mold sections formed by the members 11 and 12 are provided centrally with means for coupling the same together. In the construction shown, this result is accomplished by providing the member 11 with pivoted catch devices 25 which cooperate with pins 26 on the members 12, it being understood that the rear edge of the members 11 of one mold section are in abutting relation with the forward edges of the members 12 of an adjacent section as clearly illustrated in Figs. 2 and 3 of the drawing. These abutting edges are recessed above and below the center of the mold sections to form apertures 27 for supporting longitudinal reinforcing rods or members 28 which are preferably heavier than the rods 18 and one end of said rods protrudes through one side wall of the molds as seen at the right of Fig. 1 of the drawing, whereas the other ends of said rods terminate short of the opposite side of the chamber 16 and are supported by plug members 29 in order to prevent the projection of said rods through said ends of the molded bodies.

I also preferably insert into the channels formed by the U-shaped end walls 11 and 12, plugs or blocks 30 which extend into the channels of adjacent members 11 and 12, and lie flush with the upper surfaces thereof to prevent the concrete from passing down in between said wall members, and these blocks also serve to key and properly aline the mold sections one with the other.

One of the distinctive features of my invention lies in the fact that a multiplicity of concrete bodies may be molded in one operation and on a restricted floor or other surface, and may likewise be stacked for finished setting in a comparatively small space, and in setting up the mold sections to form the multiple mold, one end mold will be supported against a brace of any kind or class in the position shown in Fig. 2 of the drawing, and the other sections are placed side by side and coupled together in the manner above stated. After the desired number of sections has been placed in position, the opposite end section is blocked and firmly forced in the direction of the first end section thus rigidly retaining all of the sections in position it being understood that a pallet 19 is placed between each section in the assemblage thereof, the straight sides of the pallet serving to properly set or position the same between the mold sections. The reinforcing rods 18 and 28 are then placed in position, any desired number of said rods being employed and the lighter rods 18 are preferably interwoven with the rods 28. A suitable concrete mixture is now poured into the upper surface of the complete mold, and the concrete passes downwardly through the chambers 16 onto the pallets 19 until each of the chambers 16 are filled and the top surface of the molds is finished off by a trowel or other tool suitable for this purpose to maintain a flat and finished upper surface to the concrete body molded within the chamber 16.

After the concrete has set sufficiently to maintain a unit body, the outermost mold section to the right as seen in Fig. 2 of the drawing is removed, and the concrete body formed between the removed section and the next adjacent section is raised upwardly as seen at the right of Fig. 2 of the drawing, rocking in this operation on the arc-shaped or cam surface of the pallet on which the same is supported. The next adjacent mold section is then removed and the next molded body raised in the manner described, and this operation is repeated until all of the sections have been removed. The concrete bodies supported on the pallets may be allowed to stand until the concrete thereof has fully set, after which the pallets may be removed from said bodies and the same moved about, shaped or otherwise handled.

It will be understood that with my improved construction, concrete bodies may be molded at a factory or work shop and stored for shipment or shipped to dealers for storage and future sale, or if desired, the mold sections may be set up on the premises where a building is to be erected, and the concrete bodies molded on the premises for direct placement in constructing the walls of a building.

It will be understood that while I have shown and described one specific use of my invention and method of carrying it into effect, that I am by no means limited to this use, as my improved mold sections may be of such dimensions and contour to mold concrete or other bodies of any kind or class and of any desired size, form and construction. It is also to be understood that I am not necessarily limited to the use of reinforcements in the molded concrete bodies, or the provision of means on the molds for supporting such reinforcements, and various other changes in and modifications of the construction herein shown and described may be made within the scope of the appended claims, without departing from the spirit of my invention or sacrificing its advantages.

Having fully described my invention, what I claim as new and desire to secure by Letters Patent, is:—

1. A mold of the class described comprising a plurality of substantially similar mold sections adapted to be placed side by side in the construction of a multiple chamber mold, each section having a vertical wall structure, and means at the ends of said wall structure for spacing the same one from the other in the respective sections to form the mold chambers therebetween, said means comprising end wall members, extending at opposite side faces of said vertical wall, at each side thereof.

2. In a mold of the class described, a mold section comprising an elongated wall member, end wall members extending angularly with reference to opposite side faces of the ends of said first named wall member, the first named wall member being coupled with the end wall members in such manner as to assume a vertically inclined position, the upper edge of the first named wall member having angularly extending bracing and spacing members, a pallet adapted to be arranged adjacent the lower end of said first named wall member with the upper face of said pallet arranged at a vertical inclination to said wall member, and the lower surface of said pallet being arc-shaped in form.

3. In a mold of the class described, a mold section comprising an elongated wall member, end wall members extending angularly with reference to opposite side faces of the ends of said first named wall member, the first named wall member being coupled with the end wall members in such manner as to assume a vertically inclined position, the upper edge of the first named wall member having angularly extending bracing and spacing members, a pallet adapted to be arranged adjacent the lower end of said first named wall member with the upper face of said pallet arranged at a vertical inclination to said wall member, the lower surface of said pallet being arc-shaped in form, and another mold section similar to the first named section and adapted to be arranged at one side thereof, and means for coupling one section with an adjacent section to form a mold chamber therebetween, the bottom of which is formed by said pallet.

4. In a mold of the class described, a mold section comprising an elongated wall member, end wall members extending angularly with reference to opposite side faces of the ends of said first named wall member, the first named wall member being coupled with the end wall members in such manner as to assume a vertically inclined position, the upper edge of the first named wall member having angularly extending bracing and spacing members, a pallet adapted to be arranged adjacent the lower end of said first named wall member with the upper face of said pallet arranged at a vertical inclination to said wall member, the lower surface of said pallet being arc-shaped in form, and another mold section similar to the first named section and adapted to be arranged at one side thereof, means for coupling one section with an adjacent section to form a mold chamber therebetween, the bottom of which is formed by said pallet, and means for supporting reinforcing rods in said mold chamber.

5. In a mold of the class described, a mold section comprising an elongated wall member, end wall members extending angularly with reference to opposite side faces of the ends of said first named wall member, the first named wall member being coupled with the end wall members in such manner as to assume a vertically inclined position, the upper edge of the first named wall member having angularly extending bracing and spacing members, a pallet adapted to be arranged adjacent the lower end of said first named wall member with the upper face of said pallet arranged at a vertical inclination to said wall member, the lower surface of said pallet being arc-shaped in form, and another mold section similar to the first named section and adapted to be arranged at one side thereof, means for coupling one section with an adjacent section to form a mold chamber therebetween, the bottom of which is formed by said pallet, means for supporting reinforcing rods in said mold chamber, and means for keying and alining said mold sections.

6. In a mold of the class described, a mold section comprising an elongated wall member, end wall members extending angularly with reference to opposite side faces of the first named wall member at both ends thereof, and the lower portions of the end wall members being disposed angularly with reference to the vertical plane of the first named wall member to support said first named wall member in a vertically inclined position, and the upper edge of the first named wall member intermediate the end wall members having angularly extending bracing and spacing members.

7. A mold of the class described comprising a plurality of similar mold sections, each section consisting of a longitudinal, vertically inclined wall, end wall members spacing one section from the other to form mold chambers therebetween, means intermediate the end wall members for bracing and spacing said longitudinal walls at the upper ends thereof, and pallets at the lower ends of said walls and spacing one section from the other, said pallets consisting of bars arranged in said mold chambers and extending from one end wall member to the other and having throughout their length inclined upper surfaces and arc-shaped lower surfaces.

8. A mold of the class described comprising a plurality of similar mold sections, each section consisting of a longitudinal, vertically inclined wall, end wall members spacing one section from the other to form mold chambers therebetween, means intermediate the end wall members for bracing and spacing said longitudinal walls at the upper ends thereof, pallets at the lower ends of said walls and spacing one section from the other, said pallets consisting of bars arranged in said mold chambers and extending from one end wall member to the other and having throughout their length inclined upper surfaces and arc-shaped lower surfaces, and said pallets serving to movably support the molded bodies when the mold sections are removed.

9. A mold of the class described comprising a plurality of similar mold sections, each section consisting of a longitudinal, vertically inclined wall, end wall members spacing one section from the other to form mold chambers therebetween, means intermediate the end wall members for bracing and spacing said longitudinal walls at the upper ends thereof, pallets at the lower ends of said walls and spacing one section from the other, said pallets consisting of bars arranged in said mold chambers and extending from one end wall member to the other and having throughout their length inclined upper surfaces and arc-shaped lower surfaces, said pallets serving to movably support the molded bodies when the mold sections are removed, means for coupling adjacent mold sections with each other and means for keying and alining the respective sections.

In testimony that I claim the foregoing as my invention I have signed my name this 16th day of January, 1928.

WALDEMAR J. PEDERSEN.